(12) United States Patent
Ueki

(10) Patent No.: US 7,243,639 B2
(45) Date of Patent: Jul. 17, 2007

(54) VALVE FOR FUEL TANK

(75) Inventor: Yasushi Ueki, Yokohama (JP)

(73) Assignee: Nifco Inc., Yokohama (JP)

( * ) Notice: Subject to any disclaimer, the term of this patent is extended or adjusted under 35 U.S.C. 154(b) by 238 days.

(21) Appl. No.: 11/103,495

(22) Filed: Apr. 12, 2005

(65) Prior Publication Data

US 2005/0229967 A1   Oct. 20, 2005

(30) Foreign Application Priority Data

Apr. 14, 2004   (JP) .............................. 2004-119579

(51) Int. Cl.
*F02M 37/20* (2006.01)
*F02M 37/22* (2006.01)
(52) U.S. Cl. ...................... 123/516; 123/518
(58) Field of Classification Search ................ 123/516, 123/518, 519, 520, 198 D; 137/43, 202, 137/587

See application file for complete search history.

(56) References Cited

U.S. PATENT DOCUMENTS

| 5,443,561 | A | 8/1995 | Sakata et al. |
| 5,711,339 | A | 1/1998 | Kurihara |
| 6,959,720 | B2 * | 11/2005 | Kurihara et al. ............. 137/202 |
| 2001/0004890 | A1 | 6/2001 | Shimamura et al. |
| 2002/0011265 | A1 * | 1/2002 | Ganachaud .................. 137/43 |
| 2002/0121301 | A1 * | 9/2002 | Devall ......................... 137/202 |

FOREIGN PATENT DOCUMENTS

| GB | 2 388 646 | 11/2003 |
| JP | 10-238429 | 9/1998 |
| JP | 11-229984 | 8/1999 |
| JP | 2002-21665 | 1/2002 |

* cited by examiner

*Primary Examiner*—Mahmoud Gimie
(74) *Attorney, Agent, or Firm*—Manabu Kanesaka

(57) ABSTRACT

A valve for a fuel tank includes an upper space or chamber communicating with a ventilation channel; a lower chamber disposed inside a fuel tank; a communicating part for communicating the upper space with the lower chamber; and a float body disposed inside the lower chamber for floating to block the communicating part from the lower chamber when fuel flows into the lower chamber. A space between an inner surface of the lower chamber and an outer surface of the float body becomes a flow channel for gas when the float body is in a lower position. A distance between the outer surface of the float body and the inner surface of the lower chamber is not uniform in a circumferential direction of the float body. A portion having a large distance functions as a main flow channel for gas.

9 Claims, 20 Drawing Sheets

VALVE FOR FUEL TANK

BACKGROUND OF THE INVENTION AND RELATED ART STATEMENT

The present invention relates to a valve for a fuel tank.

Patent Document 1 discloses an apparatus in which, when fuel flows in from a side hole of a casing, a float valve is floated to block a valve seat formed in a passage to increase an internal pressure of a fuel tank, thereby preventing over-fueling.

In such an apparatus, gas flows into the casing through the side hole and flows out of the fuel tank from the passage through the valve seat. Until the valve is closed, the gas flows between an outer surface of the float and an inner surface of the casing. A distance between the outer surface of the float and the inner surface of the casing is substantially uniform in a circumferential direction of the float, so that the float receives a force from the gas flowing upwardly. Accordingly, even when a liquid surface of fuel does not reach a full-tank level, it is possible that the float may be floated by the gas, thereby unexpectedly closing the valve state.

Also, in such an apparatus, when a liquid surface is fluctuated during fueling, it is possible that the float may be floated, thereby unexpectedly closing the valve state even when the liquid surface of fuel dose not reach the full-tank level.

Patent Document 1: Japanese Patent Publication (Kokai) No. 10-238429

In view of the problems described above, an object of the present invention is to provide a valve for a fuel tank, in which a float is floated to close the valve when a liquid surface of fuel inside a fuel tank reaches a specific level. In the present invention, it is possible to prevent the float from unexpectedly rising to close the valve when the liquid surface of fuel inside the fuel tank does not reach the specific level.

Further objects and advantages of the invention will be apparent from the following description of the invention.

SUMMARY OF THE INVENTION

In order to solve the problems described above, according to a first aspect of the present invention, a valve for a fuel tank includes the following features (1)-(7):

(1) an upper space communicating with a ventilation channel to a canister;
(2) a lower chamber disposed inside a fuel tank;
(3) a communicating part for communicating the upper space with the lower chamber; and
(4) a float body disposed inside the lower chamber for floating to block the communicating part from the lower chamber when fuel flow into the lower chamber, wherein:
(5) a space between an inner surface of the lower chamber and an outer surface of the float body becomes a flow channel for gas such as evaporated fuel gas when the float body is in a lower position;
(6) a distance between the outer surface of the float body and the inner surface of the lower chamber is not uniform in a circumferential direction of the float body; and
(7) a portion having a large distance functions as a main flow channel for the gas.

When the float body is not floated up to a maximum ascended position for blocking the communicating part, the gas inside the fuel tank flows into the upper space from the communicating part through the space between the inner surface of the lower chamber and the outer surface of the float body upon fueling, and further flows into the ventilation channel from the upper space. The gas mostly flows through the main flow channel, and only a part of the outer surface of the float body faces the main flow channel. Accordingly, most of a force in the direction of floating the float body by the gas thus flowing is not applied to the float body. As a result, it is possible to prevent the float body from unexpectedly rising to close the communicating part due to the flow of the gas when the float body is located at a lower position.

The communicating part may include a first connecting hole and a second connecting hole. The lower chamber has an inner contour having a roughly circular sectional shape in a horizontal direction, and a dividing plate divides the circle shape left and right into a first chamber connected to the upper space through the first connecting hole and a second chamber connected to the upper space through the second connecting hole. The float body has an outer contour having a roughly circular sectional shape in a horizontal direction. The float body includes a first float disposed inside the first chamber for floating by inflow of fuel to block the first connecting hole from a side of the first chamber, and a second float disposed inside the second chamber for floating by inflow of fuel to block the second connecting hole from a side of the second chamber.

With the structure described above, the sectional shapes of the inner contours of the first chamber and the second chamber both are roughly semicircles respectively formed by a surface of the dividing plate and the divided inner surface of the lower chamber. The corresponding float bodies having the outer contours with the roughly circular sections are held inside the first chamber and second chamber having the inner contours with the roughly semicircular sectional shapes. Accordingly, distances between the inner surfaces of the lower chamber and the outer surfaces of the float bodies become uneven in both the first chamber and the second chamber. Therefore, it is possible to form the main flow channel suitably inside the lower chamber in a state in which a horizontal pitch between the first float and the second float is minimized.

According to a second aspect of the present invention, in order to solve the aforementioned problems, a valve for a fuel tank includes the following features (1)-(5):

(1) an upper space communicating with a ventilation channel to a canister;
(2) a lower chamber disposed inside a fuel tank;
(3) a communicating part for communicating the upper space with the lower chamber; and
(4) a float body disposed inside the lower chamber for floating to block the communicating part from the side of the lower chamber when fuel flows into the lower chamber from an inflow channel formed in the lower chamber, wherein:
(5) the float body is completely floated at a liquid surface level inside the lower chamber same as or lower than a level of the inflow channel.

Accordingly, when the liquid surface level of fuel inside the fuel tank is lower than a specific level, it is possible to prevent the float body from unexpectedly floating to the maximum ascended position. Further, when the liquid surface level of fuel reaches the specific level, the float body can be floated up immediately to the maximum ascended position.

The float body may be formed of a cylindrical body with an open lower cylinder end and a buoyancy adjusting body detachably fitted into the cylindrical body from the lower cylinder end.

Accordingly, when the buoyancy adjusting body for changing a volume is fitted into the cylindrical body according to need, it is possible to provide a float body with different buoyancy without changing a structure of the cylindrical body constituting the float body.

In the valve for a fuel tank according to the invention, it is possible to prevent the float from unexpectedly rising to close the valve when the liquid surface of fuel inside the fuel tank does not reach the specific level.

DETAILED DESCRIPTION OF PREFERRED EMBODIMENTS

Figure 1:
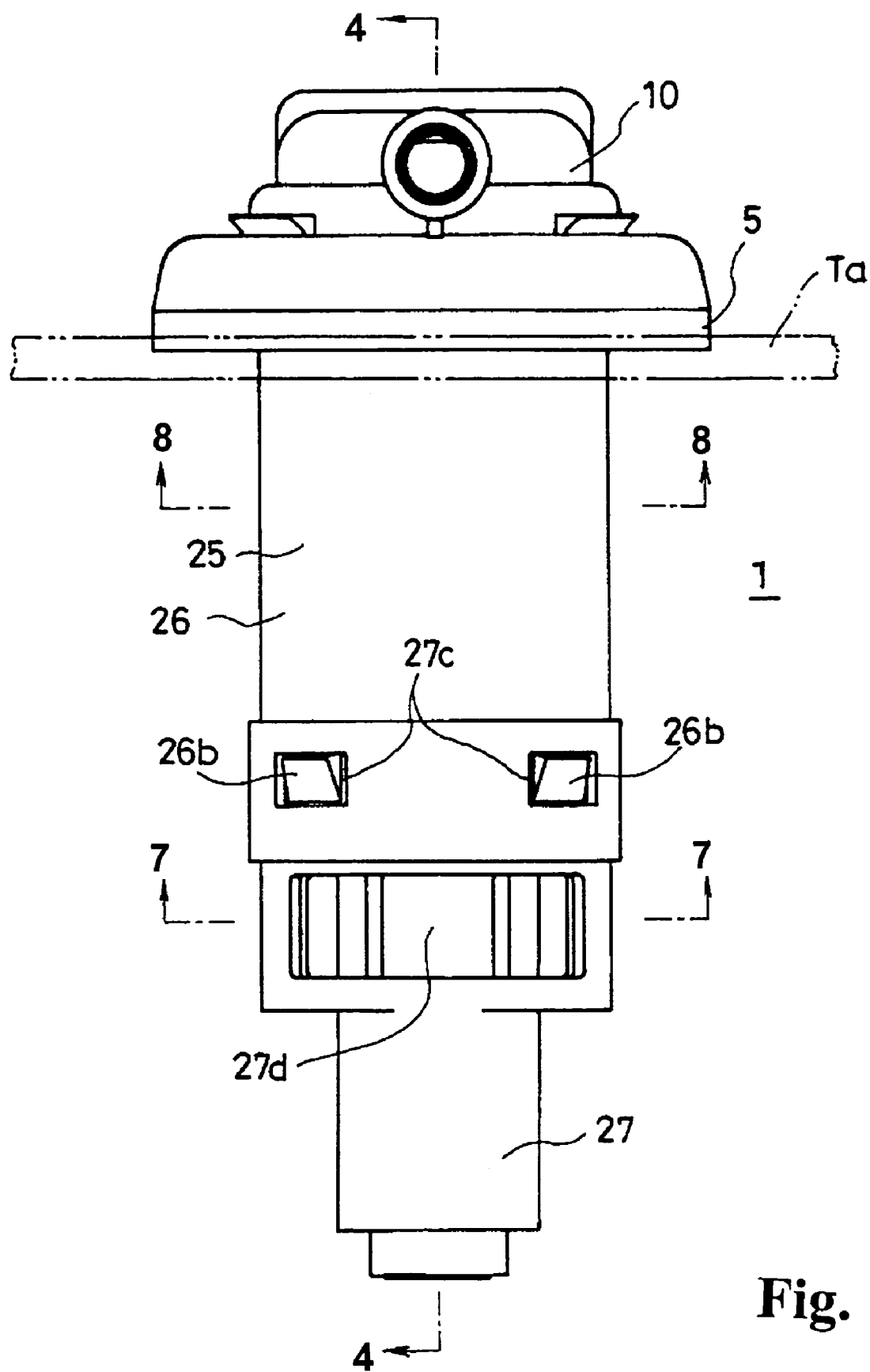
FIG. 1 is a front view of a valve according to the present invention.
Figure 2:
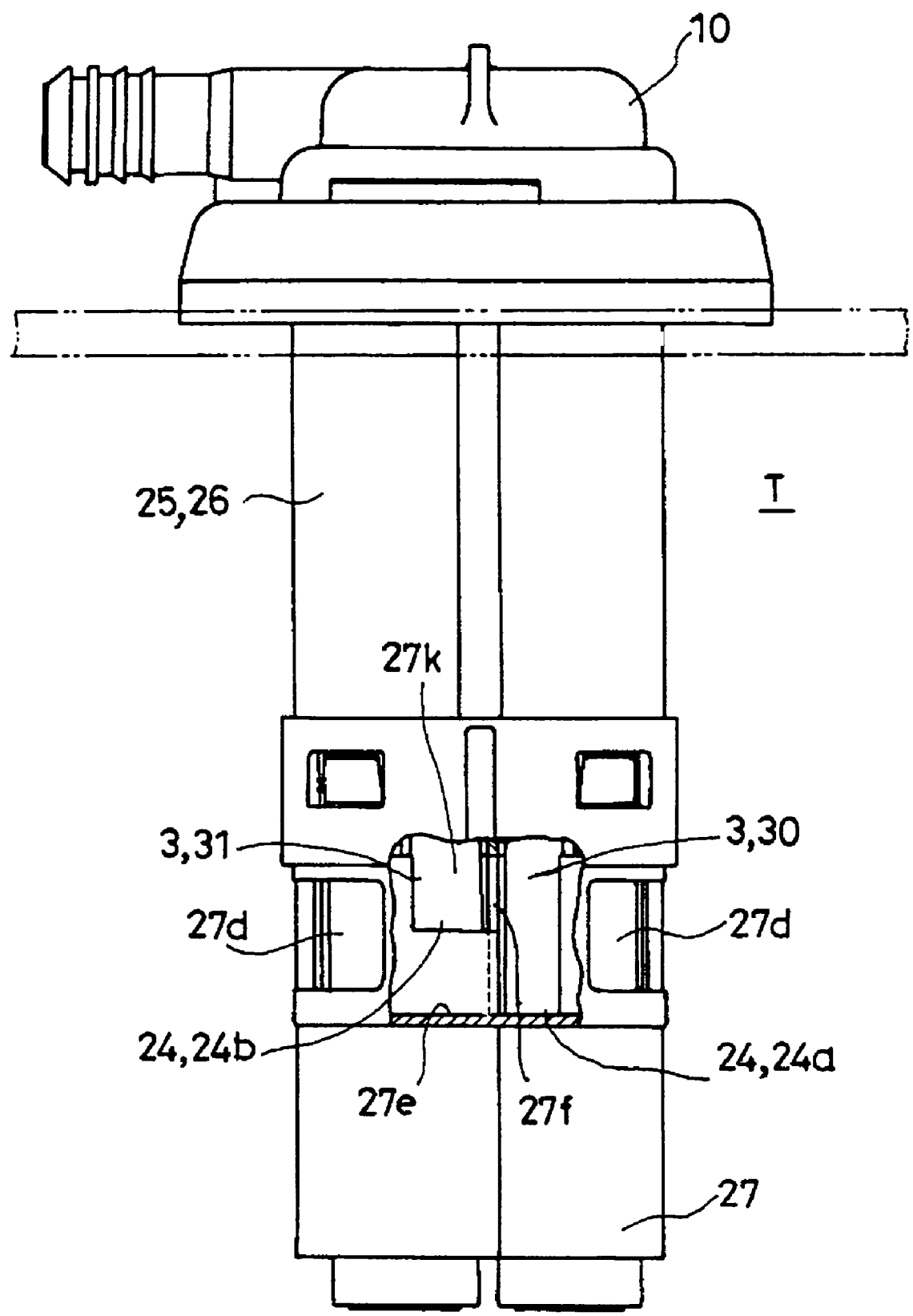
FIG. 2 is a side view thereof.
Figure 3:
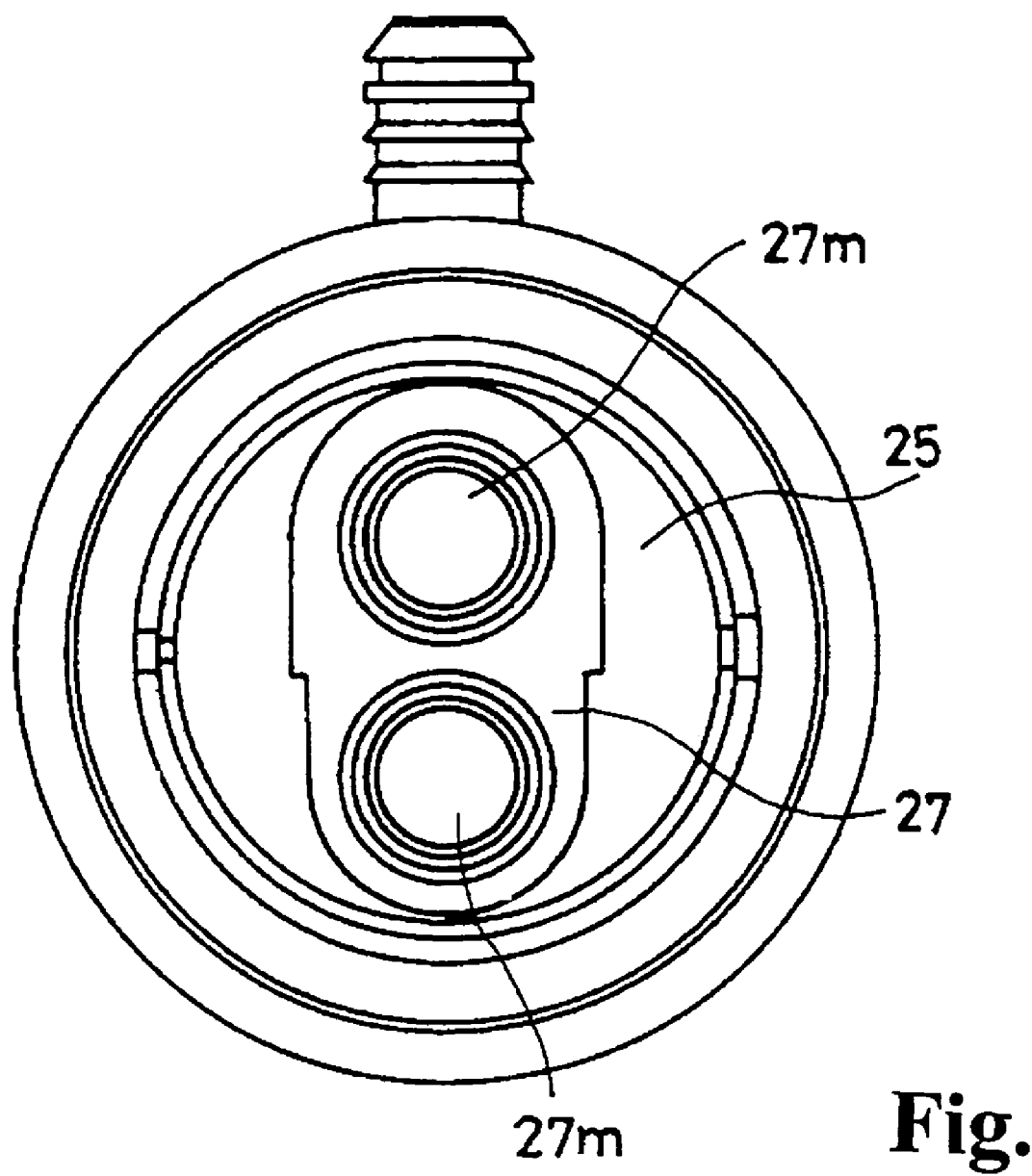
FIG. 3 is a bottom view thereof.
Figure 4:
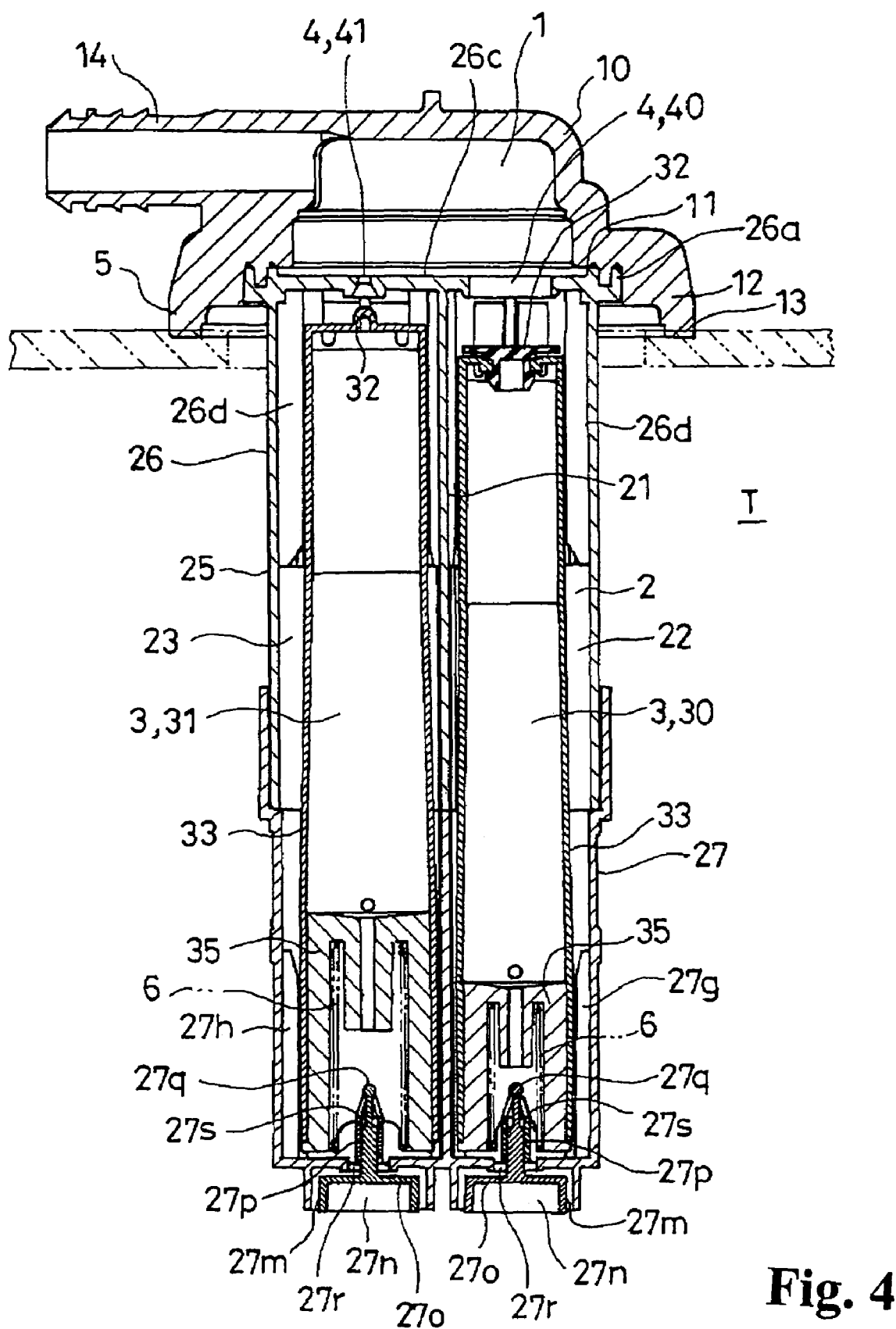
FIG. 4 is a sectional view taken along line 4-4 in FIG. 1.
Figure 5:
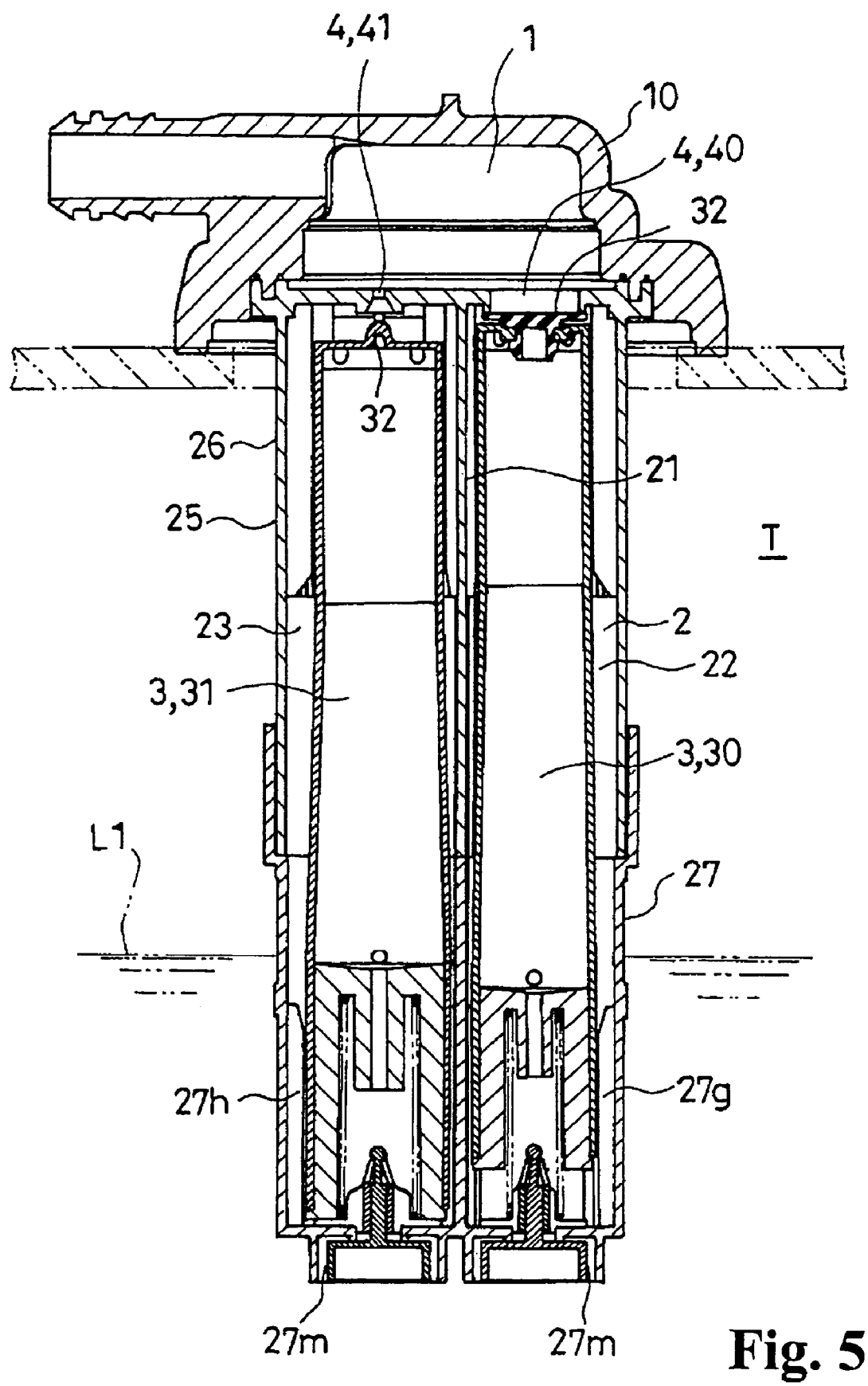
FIG. 5 is a sectional view showing an operating state of the valve.
Figure 6:
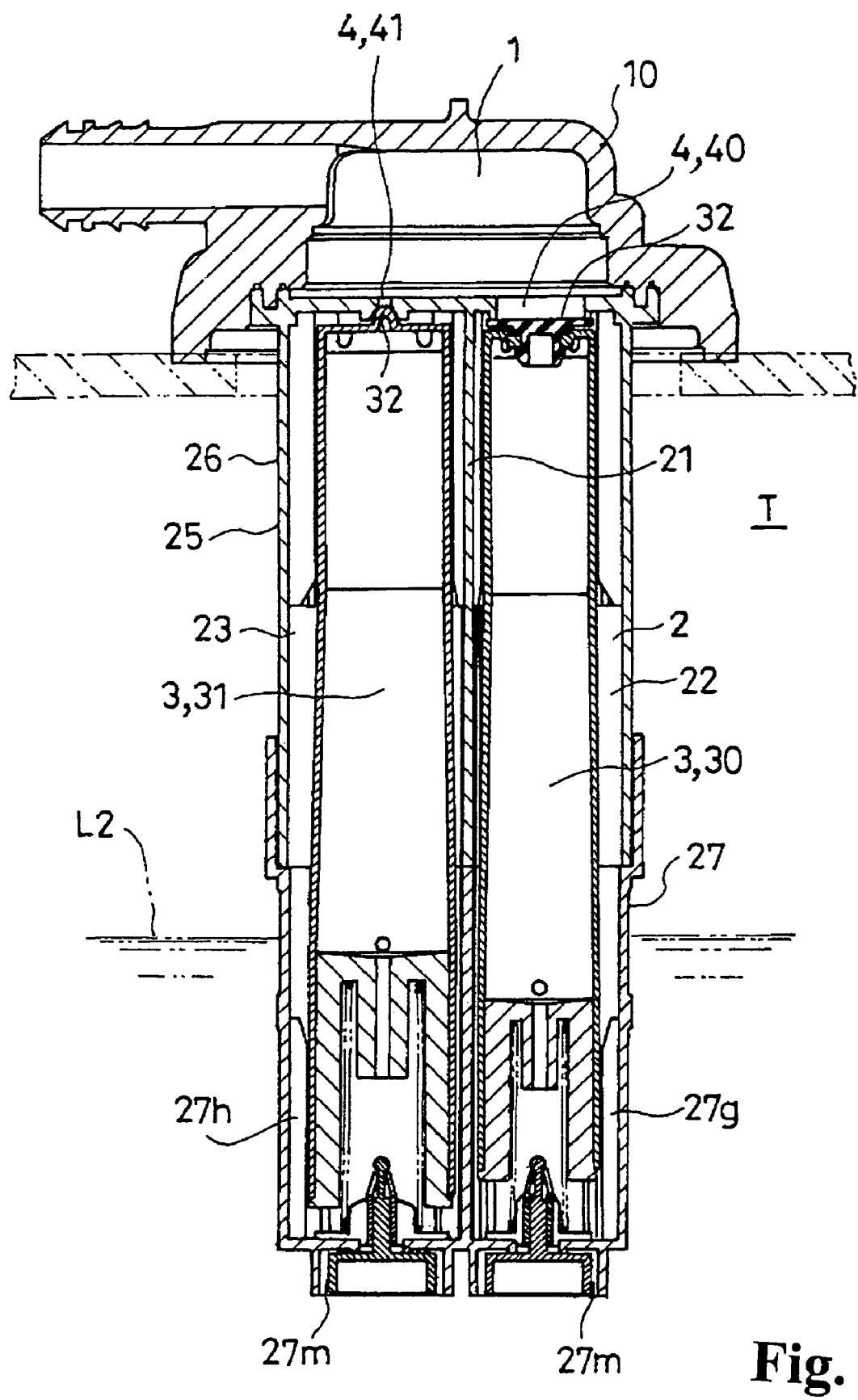
FIG. 6 is a sectional view showing an operating state of the valve.
Figure 7:
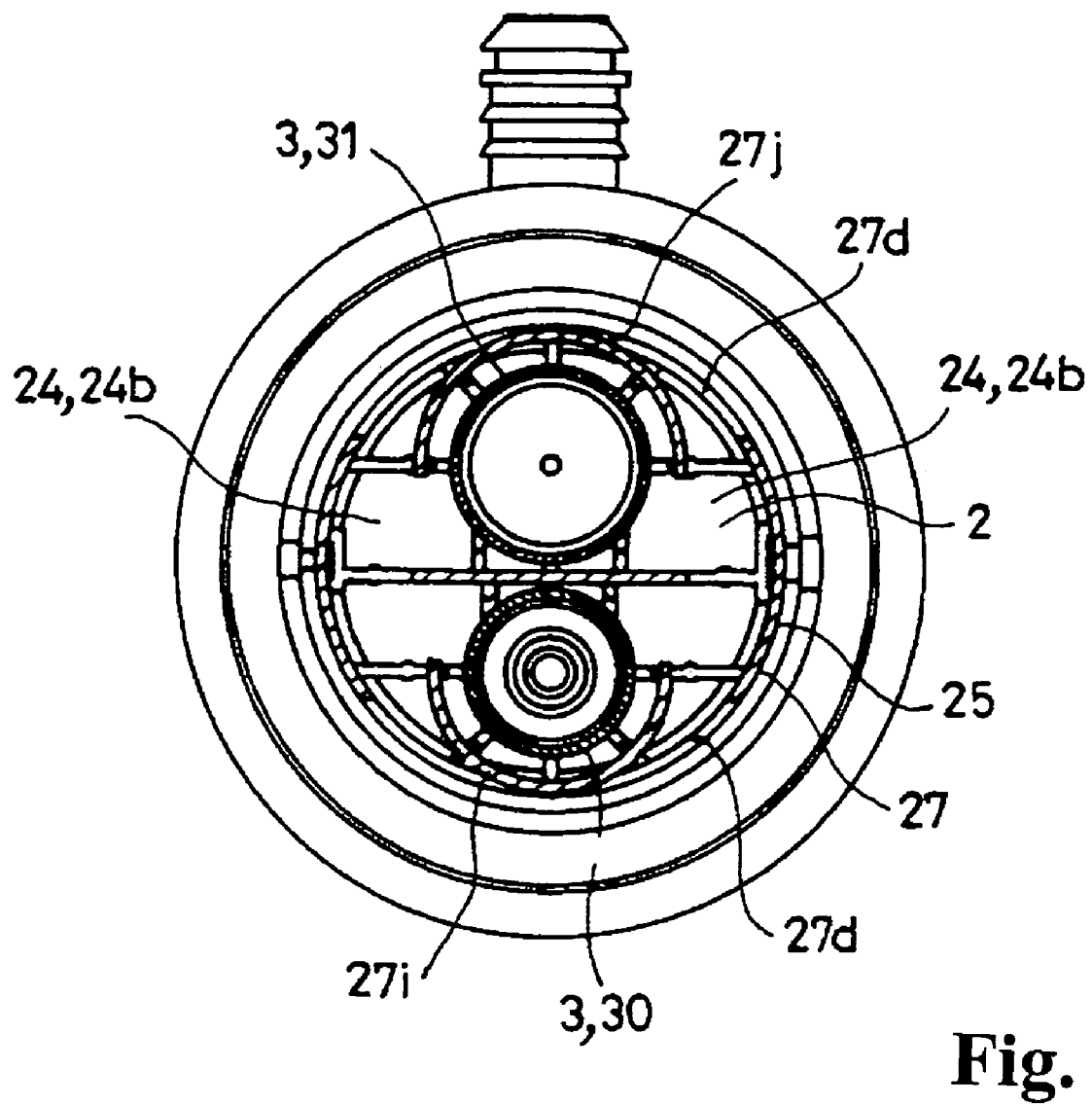
FIG. 7 is a sectional view taken along line 7-7 in FIG. 1.
Figure 8:
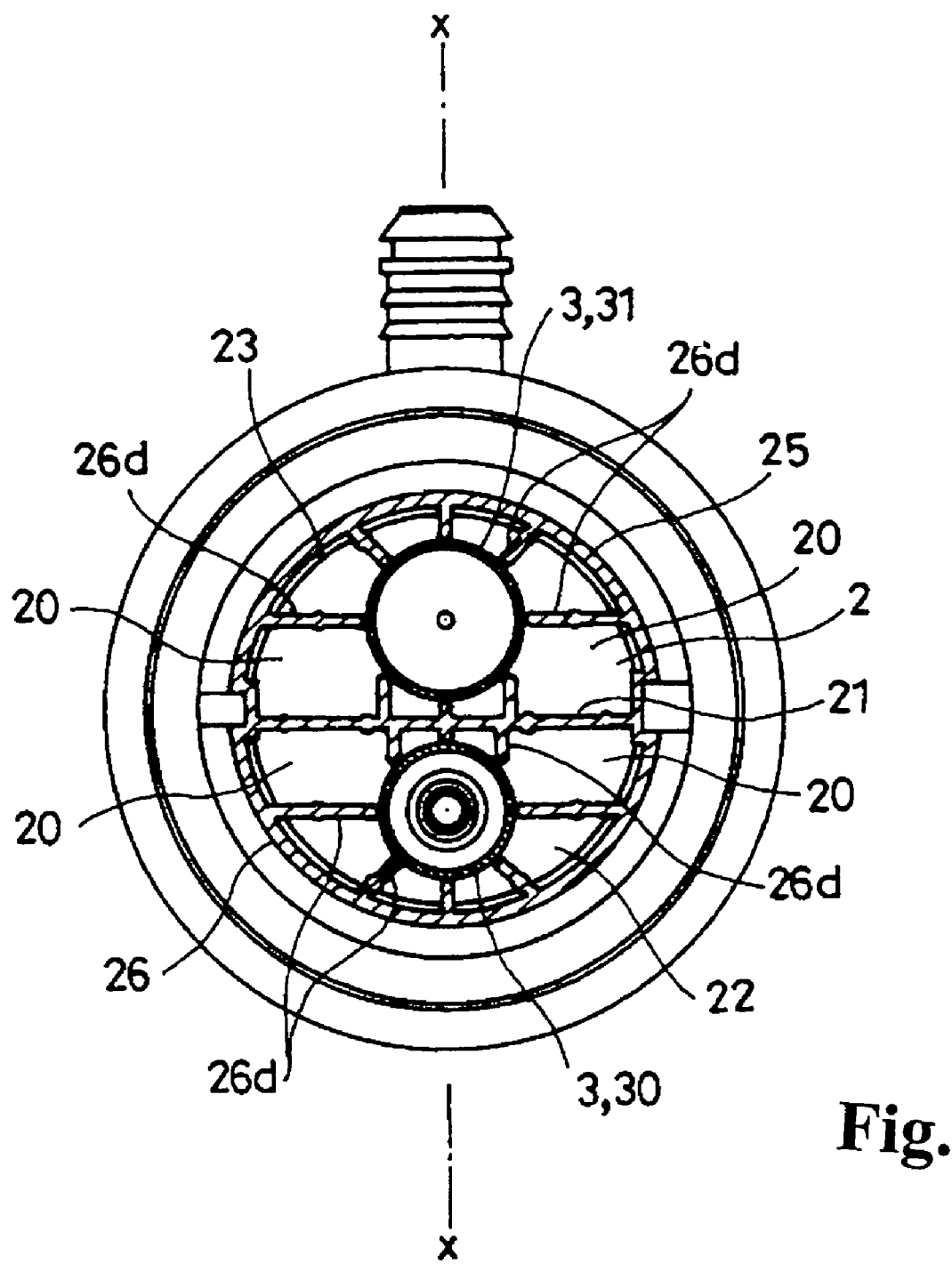
FIG. 8 is a sectional view taken along line 8-8 in FIG. 1.

Hereunder, embodiments for the present invention will be explained with reference to FIG. 1 through FIG. 21. FIG. 1 through FIG. 8 respectively show a valve pertaining to the embodiment, and in particular, FIG. 4 through FIG. 6 show operating states of the valve. FIG. 4 shows an open valve state in which a first float 30 and a second float 31 which constitute a float body 3 are in a descended position. FIG. 5 shows a state in which only the first float 30 is raised up to the maximally ascended position and closes a first connecting hole 40. FIG. 6 shows a state in which the second float 31 is raised up to the maximally ascended position from the state in FIG. 5 and a second connecting hole 41 is closed.

Figure 9:
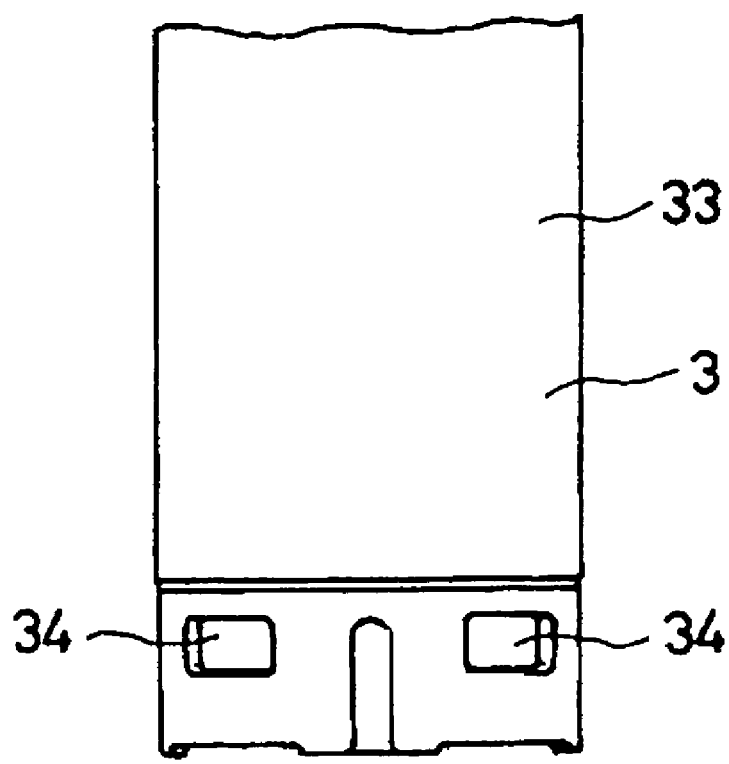
FIG. 9 is an exploded side view of essential components of a float body.
Figure 9:
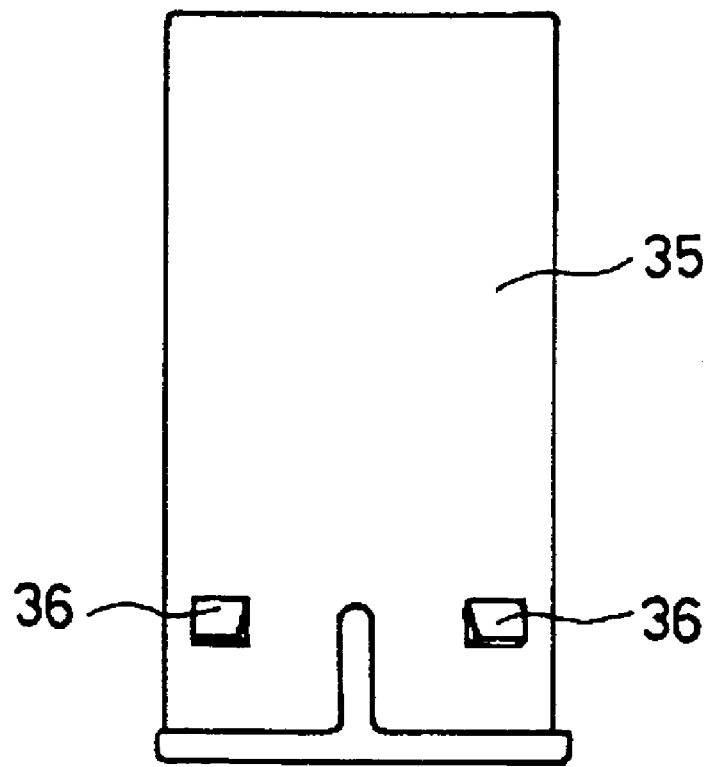
Figure 10:
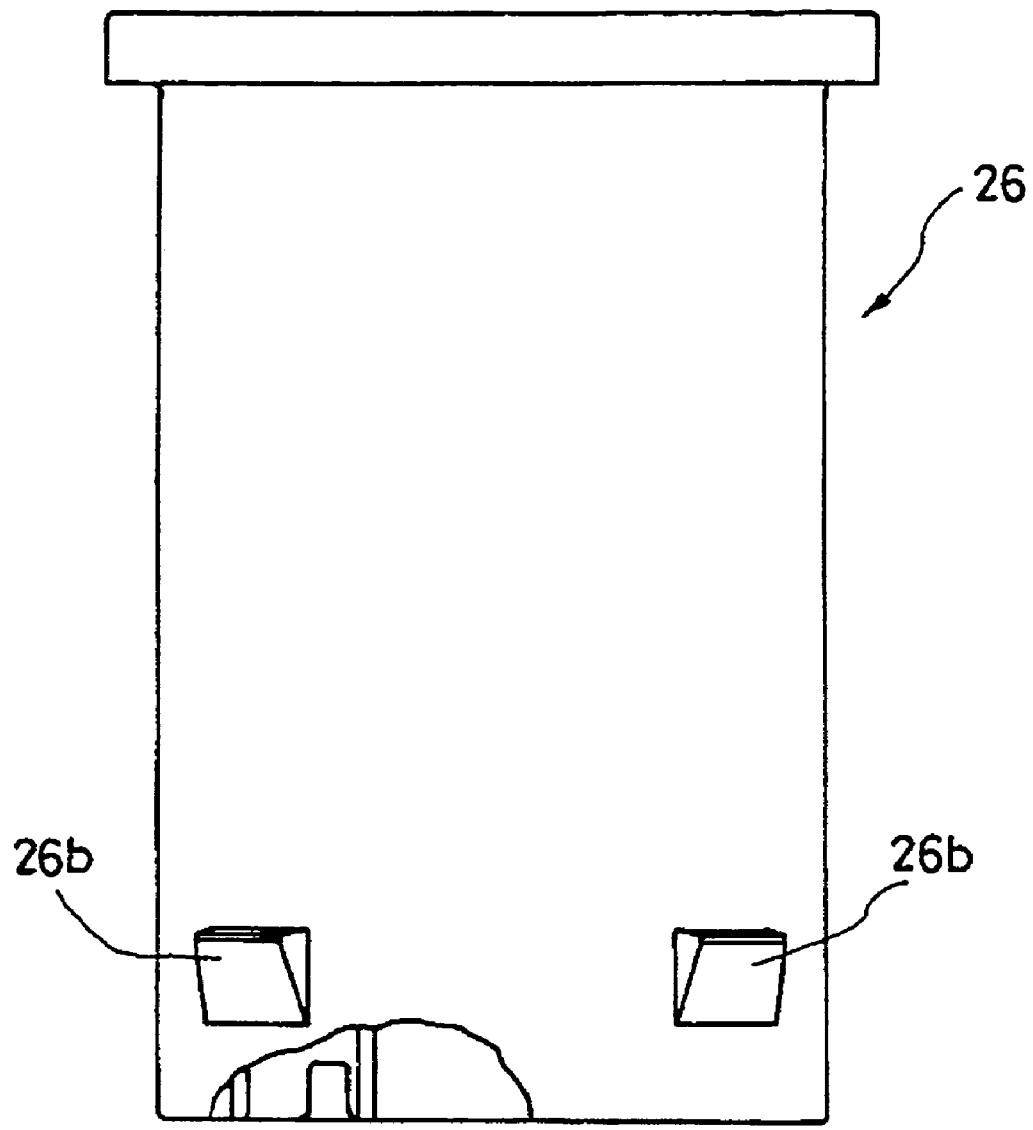
FIG. 10 is a front view of an upper case.
Figure 11:
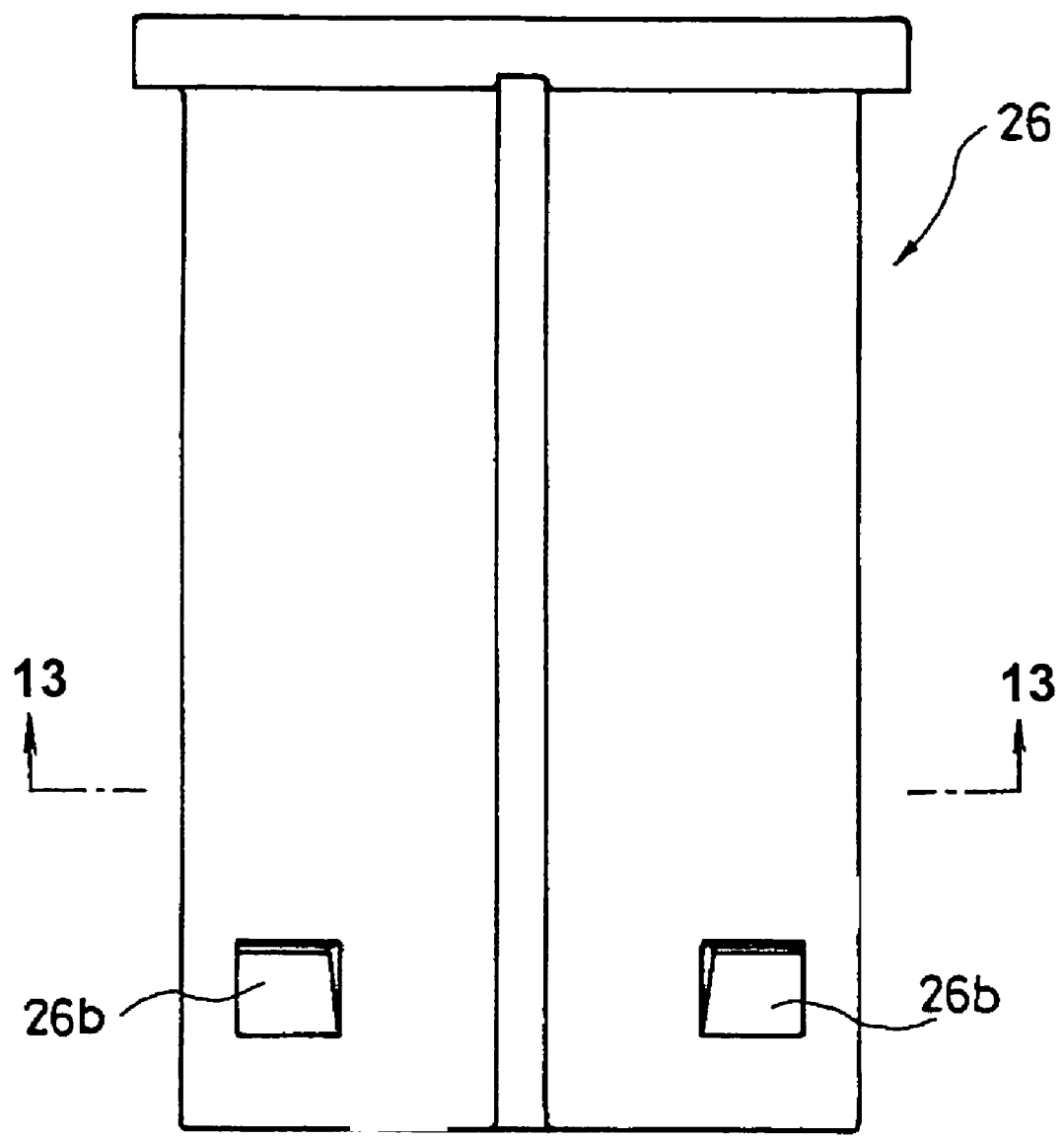
FIG. 11 is a side view thereof.
Figure 12:
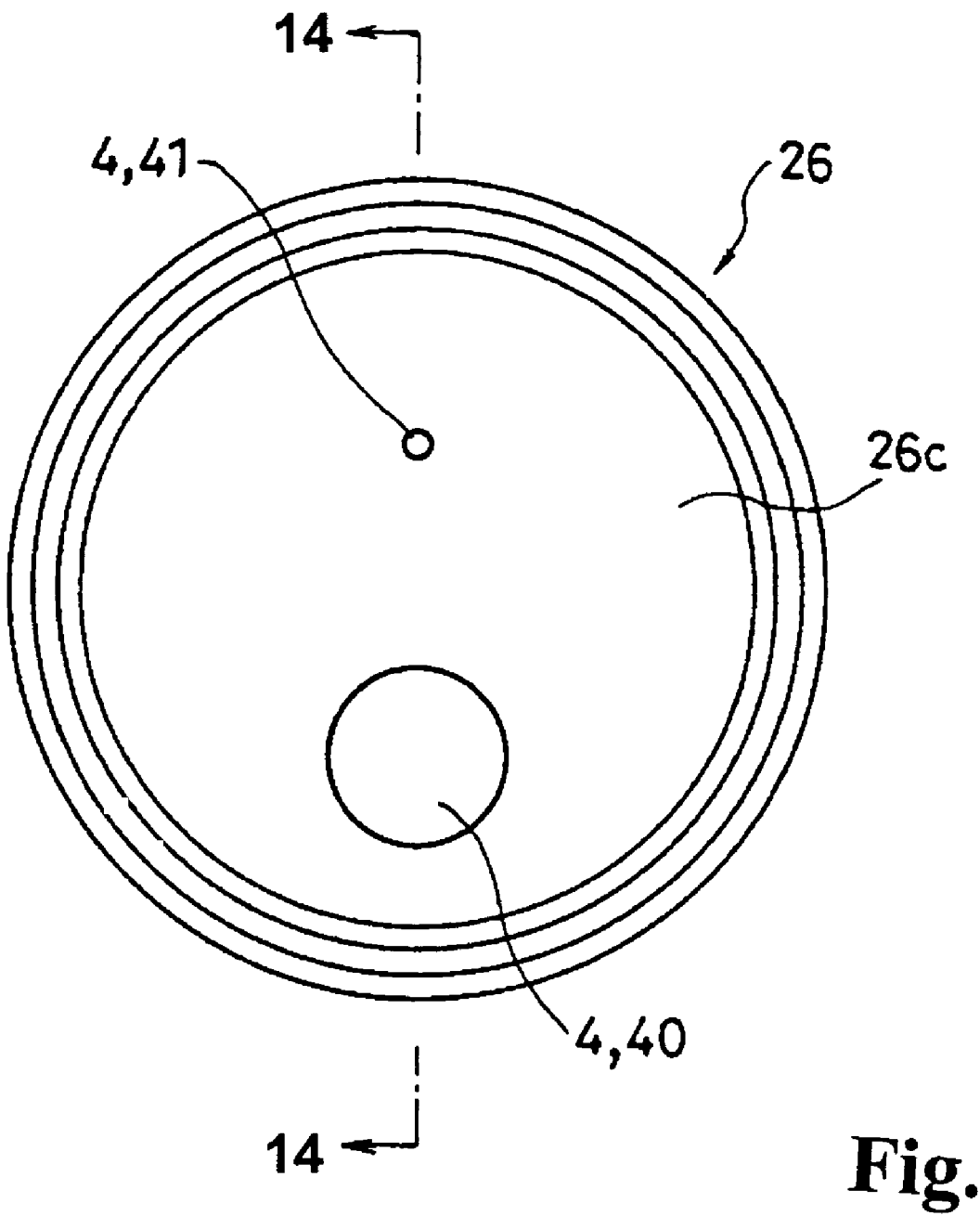
FIG. 12 is a plan view thereof.
Figure 13:
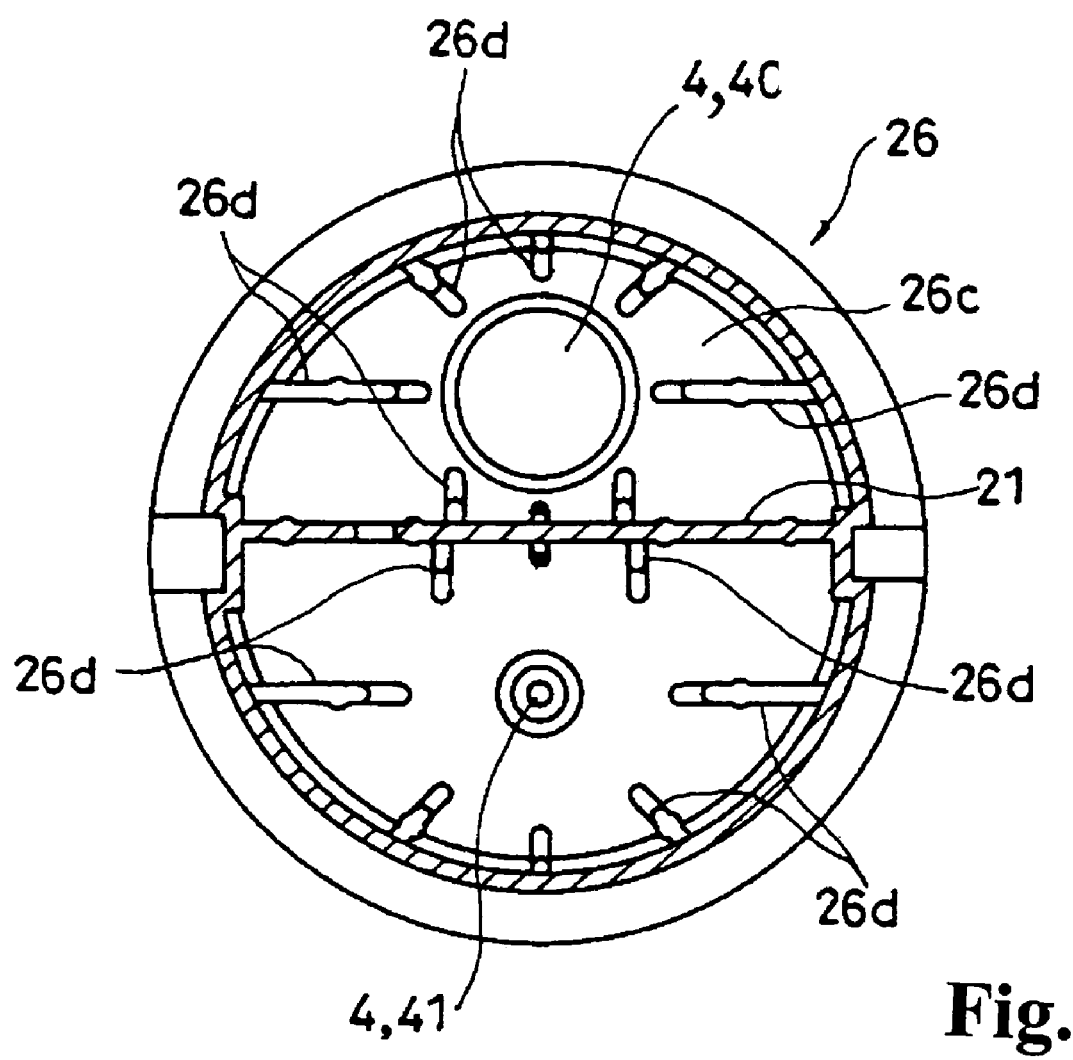
FIG. 13 is a sectional view taken along line 13-13 in FIG. 11.
Figure 14:
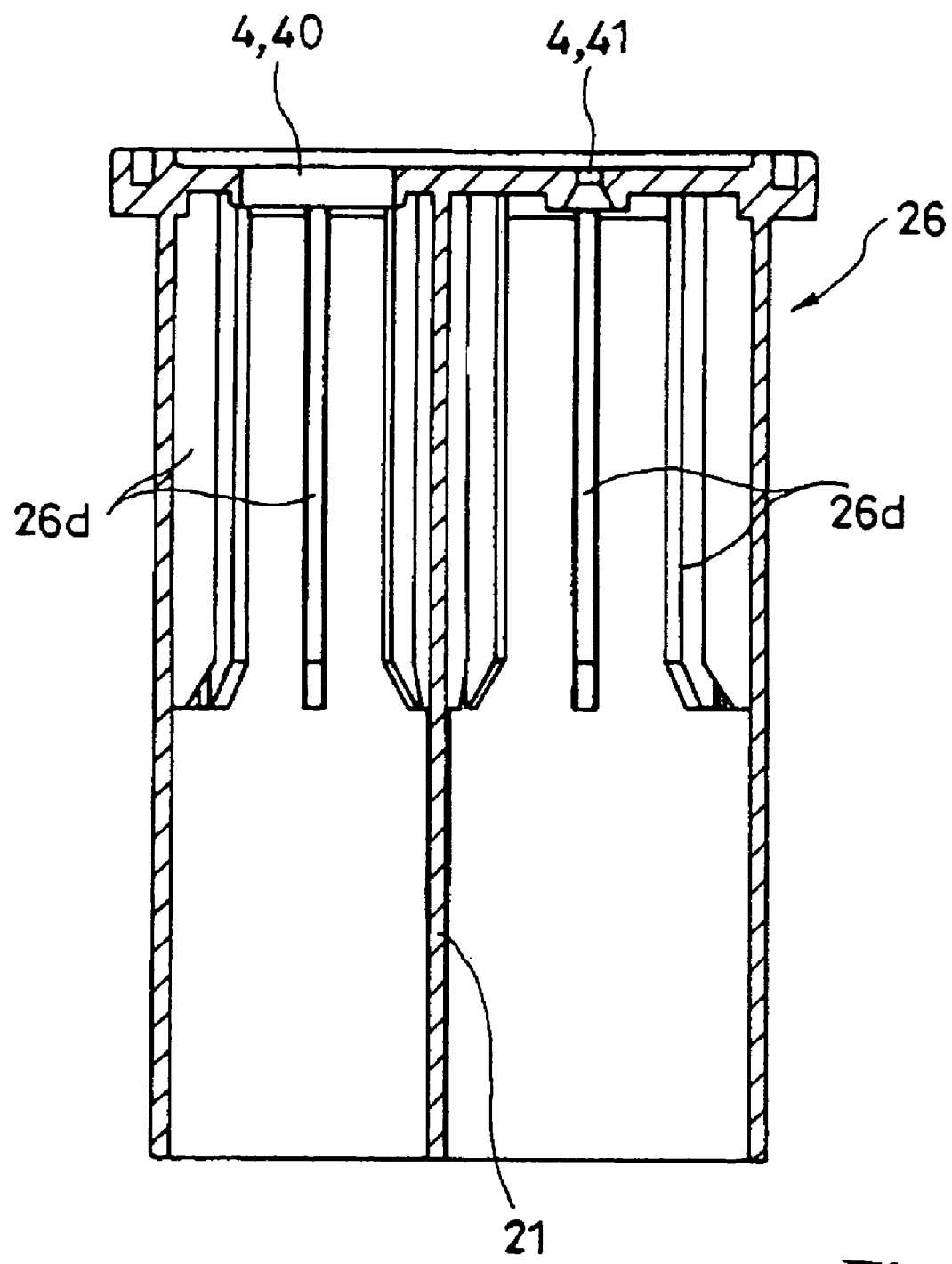
FIG. 14 is a sectional view taken along line 14-14 in FIG. 12.
Figure 15:
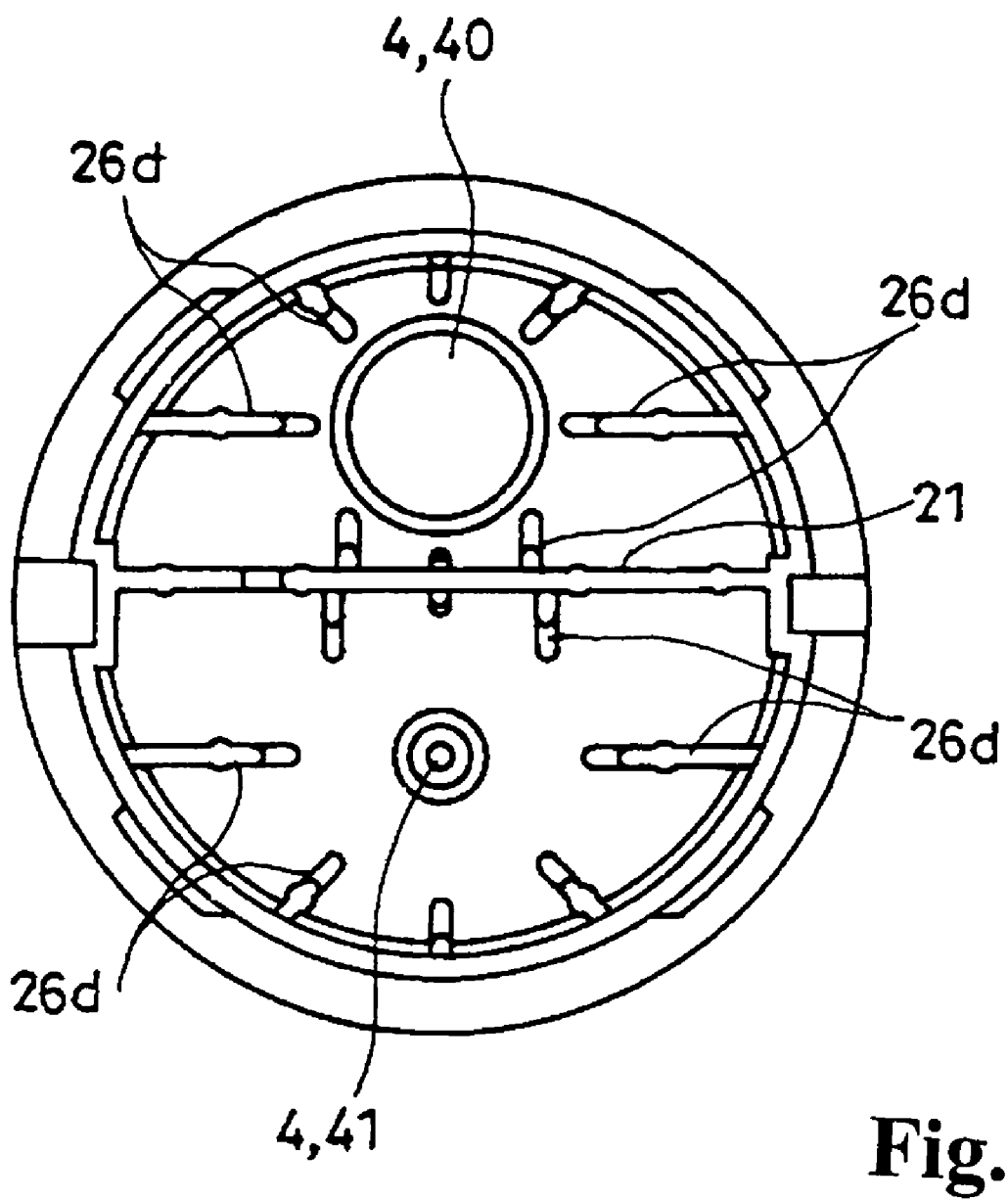
FIG. 15 is a bottom view of an upper case.
Figure 16:
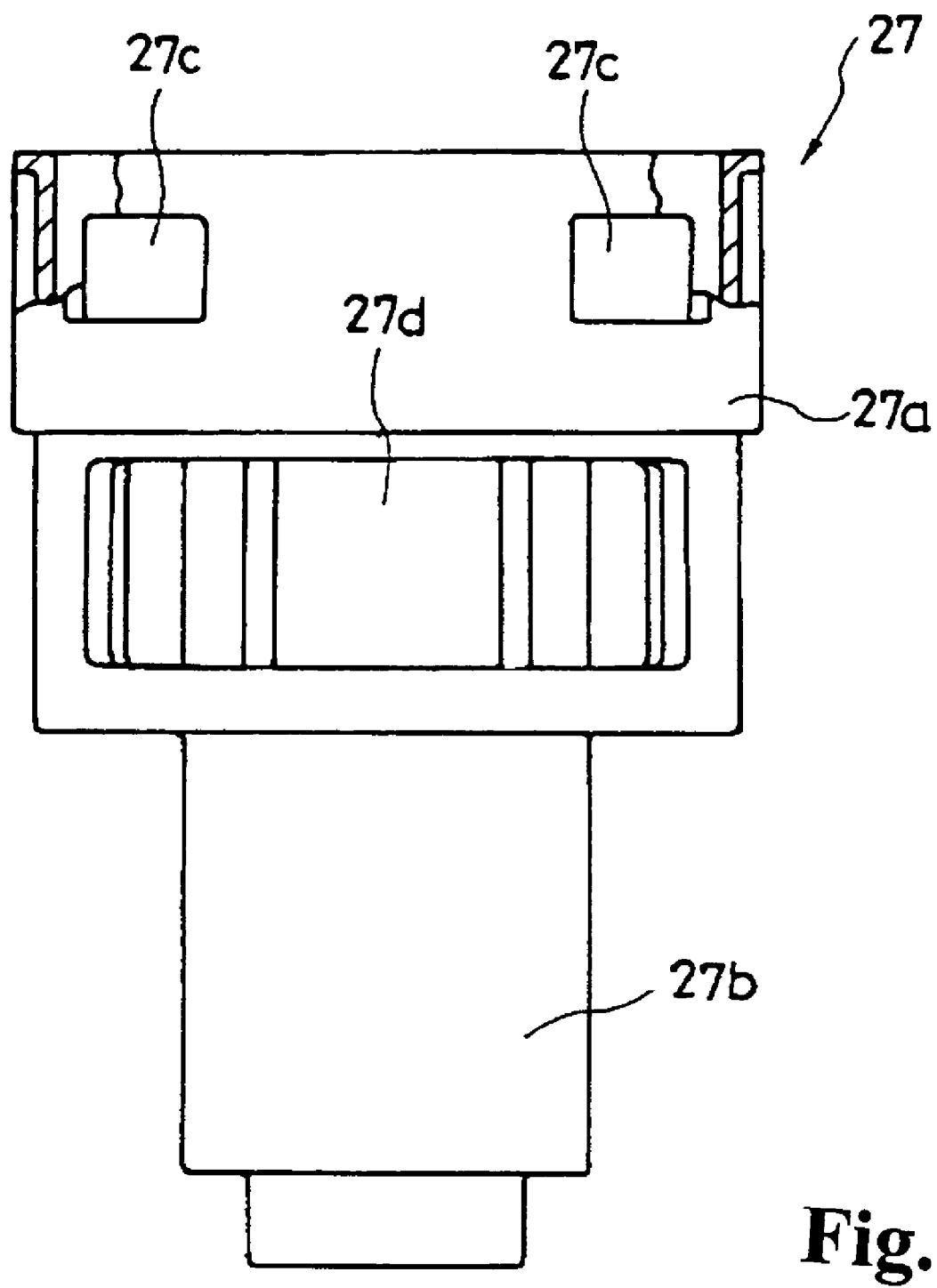
FIG. 16 is a front view of a lower case.
Figure 17:
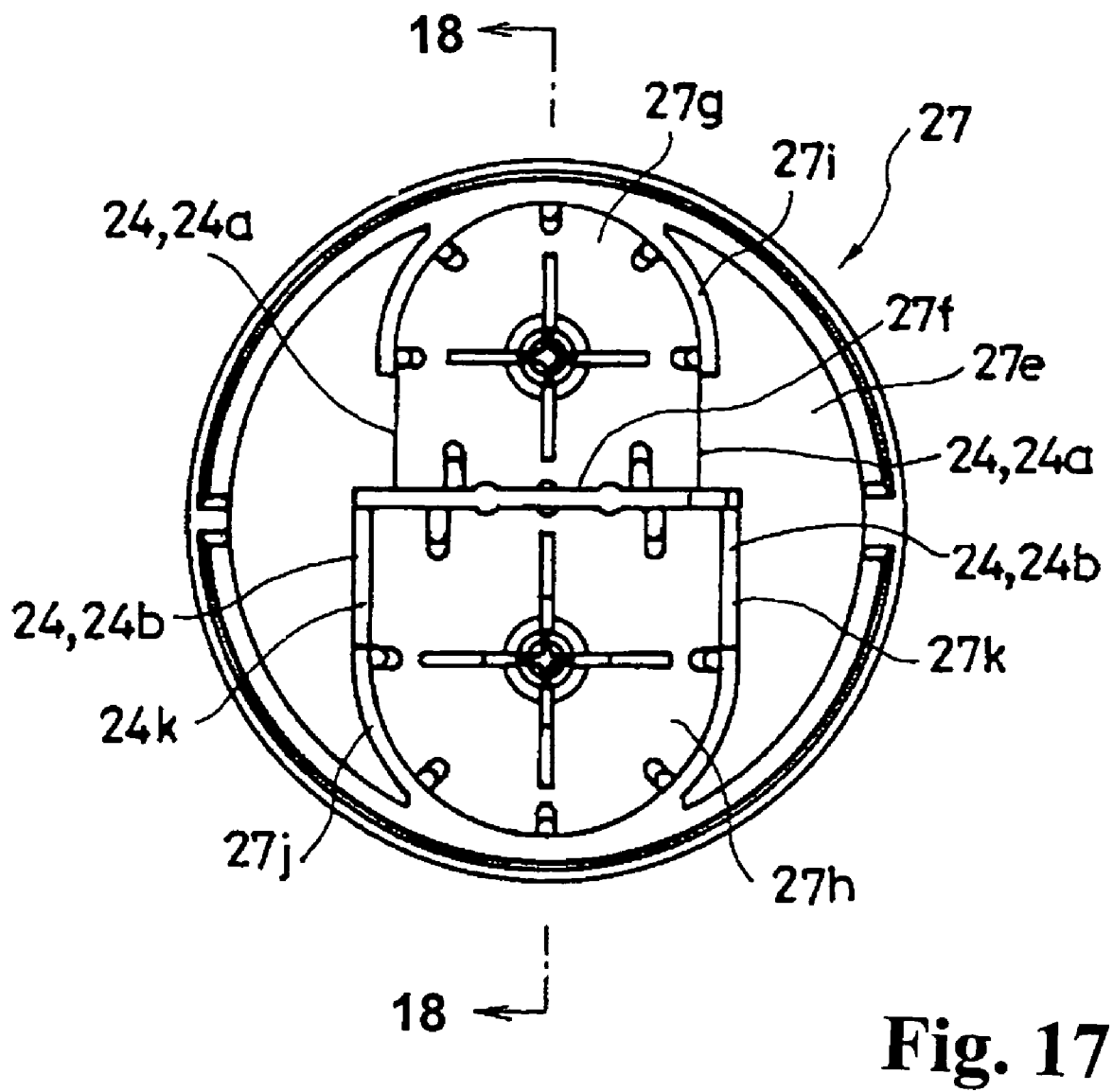
FIG. 17 is a plan view thereof.
Figure 18:
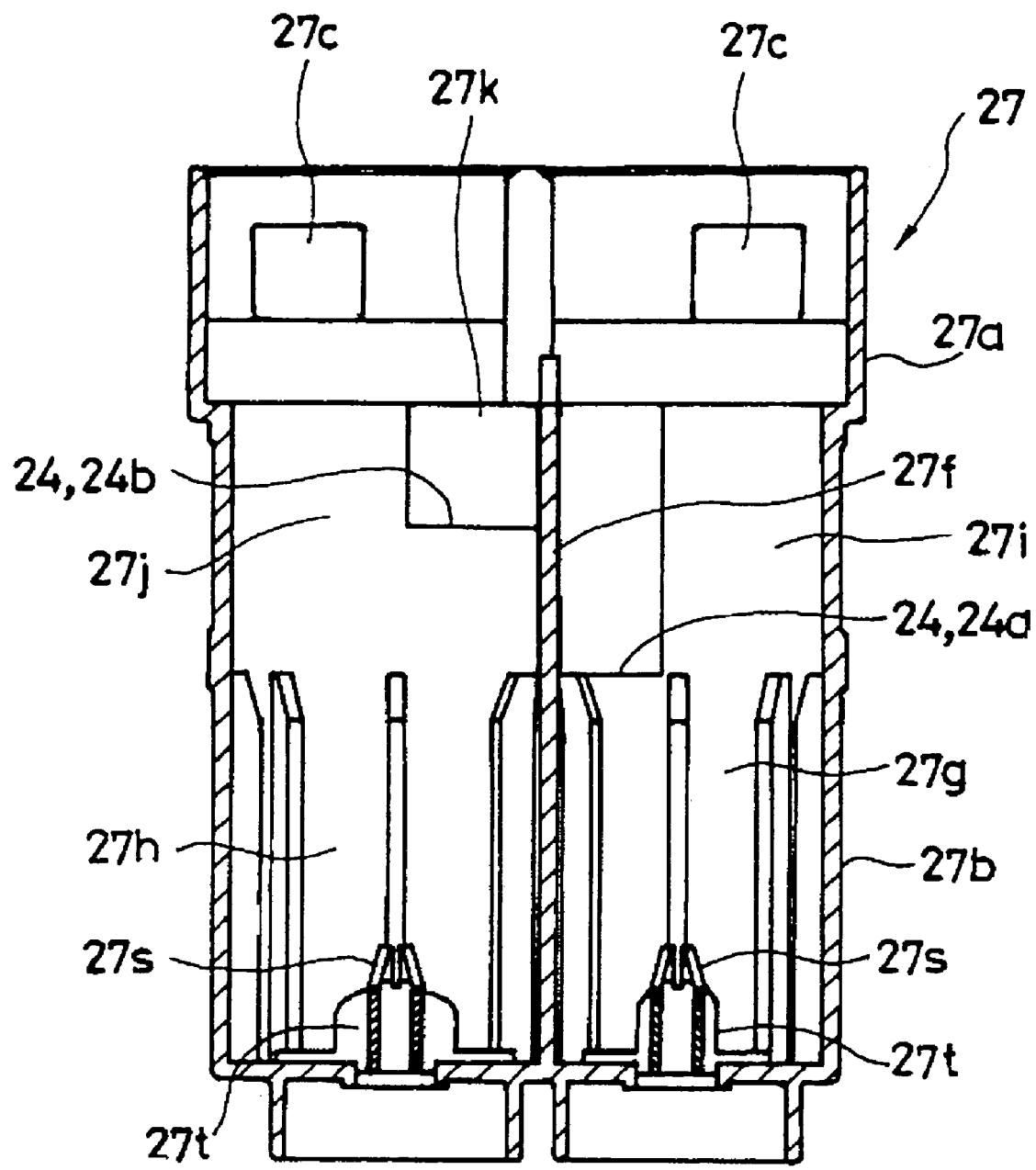
FIG. 18 is a sectional view taken along line 18-18 in FIG. 17.
Figure 19:
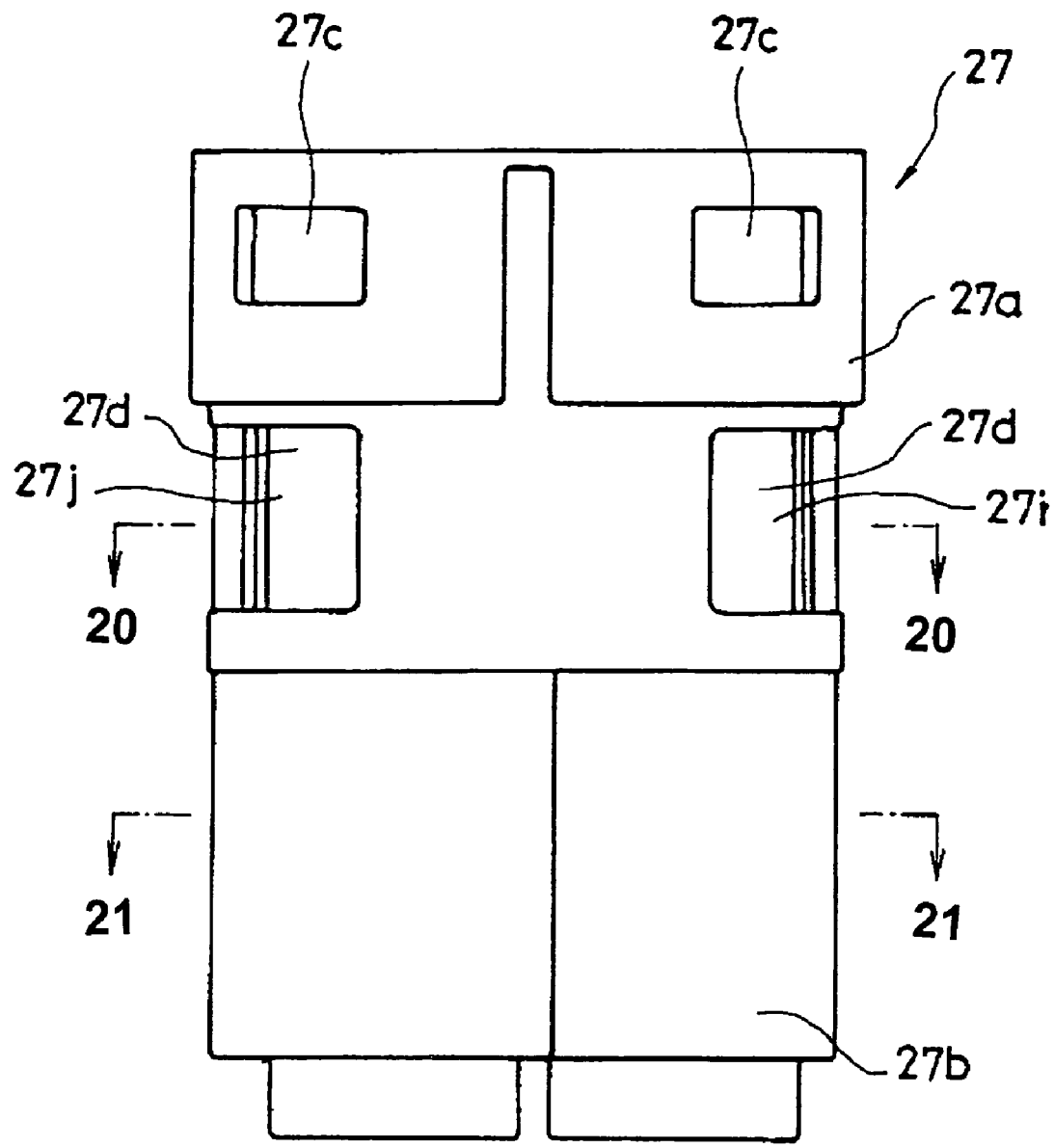
FIG. 19 is a side view of a lower case.
Figure 20:
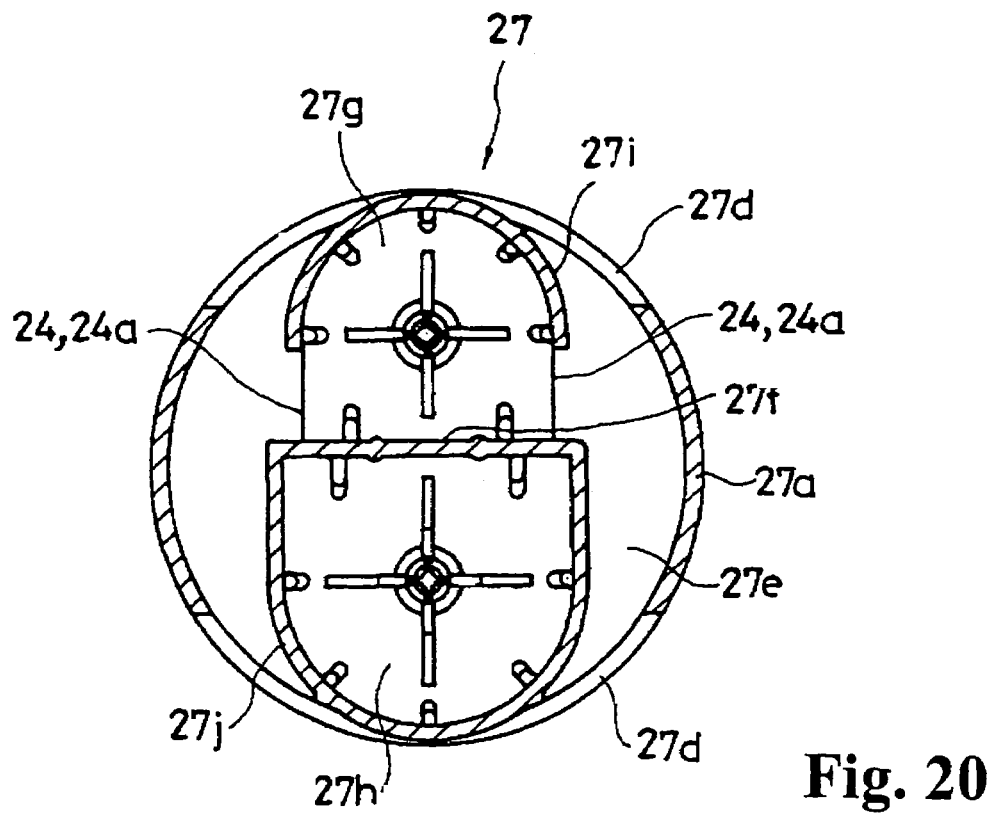
FIG. 20 is a sectional view taken along line 20-20 in FIG. 19.
Figure 21:
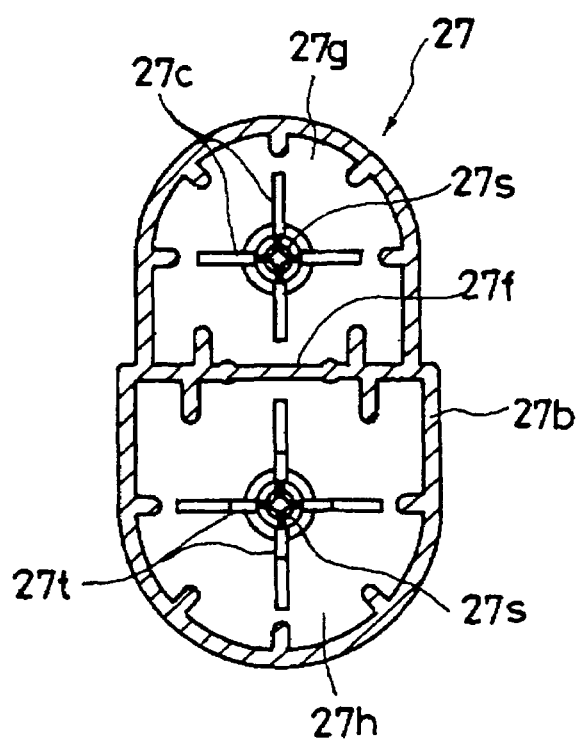
FIG. 21 is a sectional view taken along line 21-21 in FIG. 19.

FIG. 9 shows an exploded state of a cylindrical body 33 and a buoyancy adjusting body 35 which constitute the float body 3. FIG. 10 through FIG. 15 show an upper case 26 of a lower chamber structure 25 which forms the lower chamber 2. FIG. 16 through FIG. 21 show a lower case 27 of the lower chamber structure 25 which constitutes the lower chamber 2.

The valve pertaining to the embodiment has a function of blocking or reducing ventilation to a ventilation channel of a canister at a stage when the liquid surface level of fuel inside a fuel tank T reaches a specific level. In this embodiment, such a valve is used for preventing over-fueling by raising the internal pressure of the fuel tank by blocking or reduction of ventilation, raising the liquid surface level of the fuel inside a fuel tube by the rise of internal pressure, and sensing that the tank is full by a sensor on a side of the fuel supply nozzle (fuel supply gun, or the like).

Such s valve comprises an upper space 1 which is connected to the ventilation channel to the canister; a lower chamber 2 which is disposed inside the fuel tank T; and a communicating part 4 which connects the upper space 1 and lower chamber 2. Such a valve is attached to the fuel tank in a state in which it was fully inserted inside the fuel tank T, or in a state in which the lower chamber 2 side is inserted inside the fuel tank T.

In the illustrated embodiment, such a valve has an outward-facing flange 5 on its upper part, and it is made so as to be attached to the fuel tank by inserting the lower side from the flange 5 into an attachment hole provided in a state passing through the fuel tank, and fixing it by welding the outer perimeter part of the flange 5 to an outer surface part Ta of the fuel tank. That is, the valves pertaining to each of these working embodiments are made so as to be attached to the fuel tank in a state in which the side of the lower chamber 2 is inserted inside the fuel tank.

Such a valve has a float body 3 which is held inside the lower chamber 2 so as to be raised by inflow of fuel into the lower chamber 2 and to block the communicating part 4 from the side of the lower chamber 2.

When the communicating part 4 is blocked by the rising of this float body 3, the internal pressure inside the fuel tank T rises, and it becomes possible to sense the full tank condition.

In such a valve, a space between the inner surface of the lower chamber 2 and the outer surface of the float body 3 serves as a flow channel for gas such as evaporated fuel gas in the descended position. A distance between the outer surface of this float body 3 and the inner surface of the lower chamber 2 is made uneven in a circumferential direction of the float body 3. A place where this distance is wide serves as a main flow channel 20 for gas such as evaporated fuel gas. (See FIG. 8)

During the time when the float body 3 is not raised up to the maximally ascended position (that is, the position where the float body 3 is fully raised) which blocks the communicating part 4, the gas inside the fuel tank T, by fueling, flows into the upper space 1 from the communicating part 4 through the space between the inner surface of the lower chamber 2 and the outer surface of the float body 3, and further flows into the ventilation channel from this upper space 1. Because the gas mostly flows in the main flow channel 20, while only a part of the outer surface of the float body 3 faces the main flow channel 20, it can be made such that the entirety of the force in the direction of raising the float body 3, which is caused by the gas flowing, is not applied to the float body 3. By this, when the float body 3 is in the descended position, a malfunction in which the float body 3 unexpectedly rises due to the flow of gas and blocks the communicating part 4, and the full tank condition is sensed by the sensor on the side of the fuel supply nozzle before the fuel level inside the fuel tank T reaches the full tank level, can be prevented as much as possible.

The main flow channel 20 can be formed, for embodiment, by providing on the inner wall of the lower chamber 2 plural raised parts or uplifted parts extending in the vertical direction in a manner such that intervals are opened between adjacent raised parts or uplifted parts, and in addition, placing them in a manner such that the cross-sectional area of the flow channel becomes comparatively large between adjacent raised parts or uplifted parts in a certain position and the cross-sectional area of the flow channel becomes comparatively small between adjacent raised parts or uplifted parts in another certain position. That is, in this case, the channel having made the cross-sectional area comparatively large becomes the main flow channel 20.

In the illustrated embodiment, the communicating part 4 is constituted by a first connecting hole 40 and a second connecting hole 41 which is smaller than the first connecting hole 40. Furthermore, the lower chamber 2 is made roughly circular in horizontal sectional shape of the inner contour, and it is divided by a dividing plate 21 which divides the circle left and right, into a first chamber 22 connected to the upper space 1 by the first connecting hole 40 and a second chamber 23 connected to the upper space 1 by said second connecting hole 41. Furthermore, the float body 3 is made roughly circular in horizontal sectional shape of the outer contour. The float body 3 is constituted by a first float 30 which is held inside the first chamber 22 so as to be raised by inflow of fuel and to block the first connecting hole 40 from the side of this first chamber 22, and a second float 31 which is held inside the second chamber 23 so as to be raised by inflow of fuel and to block the second connecting hole 41 from the side of the second chamber 23.

Accordingly, because the sectional shapes of the inner contours of the first chamber 22 and the second chamber 23 both are made roughly as semicircles, which are respectively formed by a surface of the dividing plate 21 and the divided inner surface of the lower chamber 2, and corresponding float bodies 3, which are roughly circular in sectional shape of the outer contour, are held inside the first chamber 22 and second chamber 23, which are roughly semicircular sectional shape of the inner contour, the distances between the inner surfaces of the lower chamber 2 and the outer surfaces of the float bodies 3 become uneven in both the first chamber 22 and the second chamber 23. That is, the main flow channel 20 can be suitably formed inside the lower chamber 2 in a state in which the horizontal pitch between the first float 30 and the second float 31 is minimized (see FIG. 8).

In the illustrated embodiment, it is made such that the first float 30 immediately rises to the maximally ascended position at the position where the liquid surface level of fuel inside the fuel tank is at a specific level (below, called first liquid surface level L1), but the second float 31 stops at the descended position at the first liquid surface level L1 (FIG. 5), and the second float 31 immediately rises to the maximally ascended position at the position where the liquid surface level inside the fuel tank T is at a specific level higher than the first liquid surface level L1 (below, called second liquid surface level L2; FIG. 6). By this, in the illustrated embodiment, it is made such that, first, the internal pressure inside the fuel tank T is once raised by blocking of the first connecting hole 40 by the first float 30, a first full tank condition is sensed by the sensor on the side of the fuel supply nozzle, and over-fueling can be prevented. Also, after this, after a drop of internal pressure by ventilation from the second connecting hole 41, additional fueling up to the second liquid surface level L2 is allowed.

Furthermore, the second float 31 is raised by the additional fueling, a second fuel tank condition is sensed by the sensor on the side of the fuel supply nozzle, and over-fueling can be prevented also during the additional fueling.

Also, in the illustrated embodiment, the float body 3 is held inside the lower chamber 2 so as to be raised by inflow of fuel into the lower chamber 2 from an inflow channel 24 formed in the side of the lower chamber 2 and to block the communicating part 4 from the side of this lower chamber 2. The buoyancy of the float body 3 is set such that the liquid surface level inside the lower chamber 2 where the float body 3 is completely raised becomes the same as the level of the inflow channel 24, or a level lower than this.

By this, in the illustrated embodiment, when the liquid surface level of fuel inside the fuel tank T is lower than the full tank level (that is, in the illustrated embodiment, the first liquid surface level L1 which is the false full tank level, and the second liquid surface level L2 which is the final full tank level), the situation in which the float body 3 is unexpectedly raised to the maximally ascended position can be prevented as much as possible. In addition, when the liquid surface level of fuel reaches the specific level, the float body 3 can be floated up immediately to the maximally ascended position and the full tank condition can be sensed correctly. That is, when the liquid surface level inside the lower chamber 2 where the float body 3 is completely raised is higher than the level of the inflow channel 24, there is a possibility of occurrence of a malfunction in which the float body 3 is pushed up by fluctuation of the liquid surface of fuel inside the fuel tank T caused during fueling, or the like, the ventilation to the ventilation channel of the canister is blocked or reduced, the internal pressure inside the fuel tank is raised, the liquid level of the fuel inside the fuel tube is raised by the rise of internal pressure, and the full tank condition is sensed by the sensor on the side of the fuel supply nozzle, regardless of the fact that only an amount of fuel not actually reaching the full tank level was supplied, but if it is made thus, such malfunction does not occur.

Concretely, in the illustrated embodiment, the valve comprises:

(1) an upper space structure 10;
(2) a lower chamber structure 25;
(3) a first float 30; and
(4) a second float 31.

(Upper Space Structure 10)

The upper space structure 10 is constituted as a turned-over bowl shape which is open on the bottom surface. Also, it has a step surface for combining 11 which surrounds the open part and faces downwardly, and it is constituted such that an edge part for combining 26a, which surrounds an upper cylinder end surface of a cylindrical lower chamber structure 25, as described later, is assembled liquid-tightly on the step surface for combining 11, whereby the upper space 1 is formed above the upper cylinder end surface of the lower chamber structure 25. Also, a lower side of the step surface for combining 11 is made as a circular flange 12 which sticks outwardly, and furthermore, it has a circular raised part for welding 13 which sticks out downwardly on the outer edge part of this circular flange 12. Also, in the illustrated embodiment, it is made such that the valve is equipped on the fuel tank by inserting the lower chamber structure 25 assembled from outside the fuel tank into an attachment hole formed in a condition passing through the fuel tank, and in that state fixing by welding the circular flange 5 to the outer surface part Ta of the fuel tank using the circular raised part for welding 13. In the illustrated embodiment, a connection pipe part 14 of which one end of the pipe is integrally connected and sticks out sideways such that the inside of the pipe is connected through to the inside of the upper space structure 10 is provided on the side of the upper space structure 10, and it is made such that a tube (not illustrated), or the like, constituting the ventilation channel is connected to the connection pipe part 14.

(Lower Chamber Structure 25)

The lower chamber structure 25 is constituted by an upper case 26 and a lower case 27. The upper case 26 is constituted by a roughly cylindrical body which is closed at the upper cylinder end and opens at the lower cylinder end.

On the other hand, the lower case 27 comprises a cylindrical part 27a which is open at the upper cylinder end, and a cup part 27b of which the cup-shaped part is integrally connected to the lower cylinder end of the cylindrical part 27a. The cup part 27b is constituted such that the horizontal sectional shape of the inner contour is made as an oblong shape having a long axis being almost equal to a diameter of the cylindrical part 27a and a short axis being shorter than this.

Coupling bumps 26b are formed on an outside part on the side of the lower cylinder end of the upper case 26, and on the other hand, coupling windows 27c are formed on side parts on the side of the upper cylinder end of the cylindrical part 27a of the lower case 27. In the illustrated embodiment, it is made such that the lower cylinder end of the upper case 26 is inserted from the upper cylinder end of the cylindrical part 27a of the lower case 27 such that the coupling bumps 26b are elastically inserted into the coupling windows 27c from the inside of the lower case 27, whereby the two cases are combined and the lower chamber 2 is formed inside it.

The inside of the upper case 26 is divided left and right by a dividing plate 21 of which the upper plate end is integrally connected to the inner surface of the upper plate of the upper case 26, the lower plate edge is positioned at the same level as the lower cylinder end of the upper case 26, and the side plate edges are integrally connected to the inner surface of the upper case 26. It is made such that the first chamber 22 and the second chamber 23 which are divided by the dividing plate 21 have about the same size.

Also, on the upper plate 26c of the upper case 26, there are provided a first connecting hole 40 which is blocked by the first float 30 and a second connecting hole 41 which is blocked by the second float 31, which pierce through the upper plate 26c. The first connecting hole 40 is constituted such that the aperture is made larger than the second communicating hole 41.

Also, inside the first chamber 22 and the second chamber 23 of the upper case 26, plural support rib bodies 26d, which guide the outer surface of the float body 3 with the front ends of the ribs, are formed following the vertical direction in a manner such that intervals are opened between adjacent support rib bodies 26d. The support rib bodies 26d are formed on the inner surface of the upper case 26 facing the first chamber 22 and the second chamber 23 and on the plate surface of the dividing plate 21. By the plural support rib bodies 26d, formed in this manner, the float body 3 is supported to be capable of moving in the vertical direction in a state in which the center axis of the float body 3 is about positioned on an imaginary straight line x going in a direction orthogonal to the plate surface of the dividing plate 21 and passing through about the center in the thickness direction of the dividing plate 21. Intervals serving as gas flow channels are formed in the circumferential direction of the float body 3 between the outer surface of the float body 3 and the inner surface of the upper case 26 as well as the plate surface of the dividing plate 21. Also, it is made such that gas flowing in from inflow openings 27d formed beneath the coupling windows 27c on the sides of the cylindrical part 27a of the lower case 27 passes through between the outer surface of the float body 3 thus supported and the inner surface of the upper case 26 and is sent into the upper space 1 from the communicating part 4.

In the place of connection between the cylindrical part 27a and the cup part 27b of the lower case 27, a step surface 27e oriented above and below the difference of inner diameters of the two is formed. Also, on both sides in the diameter direction of the cylindrical part 27a, the inflow openings 27d which are opened long in the circumferential direction of the cylindrical part 27a are formed upwardly from the step surface 27e. It is made such that the lower edges of the openings of the inflow openings 27d are positioned somewhat upwardly from the step surface 27e.

Also, the cup part 27b is divided into a first cup chamber 27g and a second cup chamber 27h having about equal size, by a cup dividing plate 27f which divides the cup part 27b liquid tightly left and right, having a plate surface which follows the short axial direction of the oblong shape of the cup part 27b having an oblong sectional shape of inner contour. It is made such that the first cup chamber 27g is positioned beneath the first chamber 22, and the second cup chamber 27h is positioned beneath the second chamber 23. Also, it is made such that the lower part of the first float 30 of which the upper part of the float is positioned in the first chamber 22 is held inside the first cup chamber 27g, and the lower part of the second float 31 of which the upper part of the float is positioned in the second chamber 23 is held inside the second cup chamber 27h. The cup dividing plate 27f is constituted so as to have a height such that its upper plate edge is butted together with the lower plate edge of the dividing plate 21 of the upper case 26 in the state in which the lower case 27 and the upper case 26 are combined.

Also, a first curved plate body 27i, which is integrally connected at the lower plate end to the edge of the opening of the first cup chamber 27g, being the edge of the opening meeting the arc-shaped part on the edge of the oblong-shaped opening of the cup part 27b, and projects upwardly having a curve following this arc, and the upper plate end is positioned somewhat upwardly from the upper edge of the opening of the inflow opening 27d, is formed on top of the step surface 27e. Also, it is made such that fuel flowing in from the inflow openings 27d comes into the first cup chamber 27g with the space between both side edges of the first curved plate body 27i and the cup dividing plate 27f as a first inflow channel 24a.

Also, a second curved plate body 27j, which is integrally connected at the lower plate end to the edge of the opening of the second cup chamber 27h, and projects upwardly having inner and outer surface shapes following the shape of the inner contour of this second cup chamber 27h, is formed on top of the step surface 27e. The second curved plate body 27j is integrally connected to the cup dividing plate 27f, and the curved part has the same height as the first curved body. On the side of connection with the cup dividing plate 27f, it is constituted so as to have an upper plate edge which is higher than the step surface 27e but lower than the upper plate edge of the curved part by a cut-out part 27k formed so as to cut in downwardly. Also, it is made such that fuel flowing in from the inflow openings 27d comes into the second cup chamber 27h with the cut-out part 27k of the second curved plate body 27j as a second inflow channel 24b.

By this, it is made such that the first float 30 which is supported having the lower part of the float held inside the first cup chamber 27g immediately floats up to the maximally ascended position when the liquid surface level of the fuel exceeds the lower edge of the opening of the inflow opening 27d. The second float 31 which is supported having the lower part of the float held inside the second cup chamber 27h is not raised at this stage, and it floats up to the maximally ascended position when the liquid surface level of the fuel exceeds the level of the second inflow channel 24b.

Also, in the illustrated embodiment, a one-way valve 27m is provided on the bottom part of the cup 27b, that is on each of the bottom part of the first cup chamber 27g and the bottom part of the second cup chamber 27h. This can be substituted also by providing an orifice on such bottom part.

Such one-way valve 27m is constituted by: a valve body 27n comprising a disk-shaped valve cover 27o and a leg 27p with an escape preventing head part 27q which projects upwardly from about the center of the upper surface of this valve cover 27o; a through-hole 27r which is formed on the bottom part of the cup part 27b, and has the leg 27p of the valve body 27n inserted from beneath the cup part 27b, and is blocked from beneath by the valve cover 27o of the valve body 27n in the ascended position of this valve body 27n; and a support body 27s which is supported by a leg piece 27t above the through-hole 27r inside the cup part 27b, passes through the leg 27p of the valve body 27n to be capable of moving up and down, and is pulled from above by the escape preventing head part 27q.

Such a valve body 27n falls by its own weight and clears the blockage of the through-hole 27r by the valve cover 27o when the fuel is consumed and its liquid surface level falls beyond the level of the bottom part of the cup part 27b. By this, the fuel inside the cup part 27b flows out from the through-hole 27r, the float body 3 falls down to the descended position, and the communicating part 4 is opened. On the other hand, when the liquid surface level of the fuel rises due to fueling, the valve body 27n is pushed up by the rising in the direction of pushing the valve cover 27o to block the through-hole 27r, such that fuel is not let into the cup part 27b until the liquid surface level of the fuel reaches a prescribed full tank level.

Meanwhile, the float body 3, both for the first float 30 and second float 31, is constituted to have a hollow cylindrical shape with the upper cylinder end as a valve body part 32.

Also, in this embodiment, such a float body 3 is constituted by a cylindrical body 33 which is open at the lower cylinder end, and a buoyancy adjusting body 35 which is detachably fitted inside the cylindrical body 33 from the lower cylinder end.

The buoyancy adjusting body 35 has a cylindrical shape which is closed at the upper end and opens at the lower end, and an outer diameter is made about equal to an inner diameter of the cylindrical body 33 or slightly smaller than this. Also, a coupling bump 36, which elastically couples with a window hole 34 formed in the lower part of the cylindrical body 33 by insertion of the buoyancy adjusting body 35 from the lower cylinder end of the cylindrical body 33, is formed on the outer surface of the side of the buoyancy adjusting body 35. This coupling becomes capable of release by inserting the tip of a tool such as a screwdriver into the window hole 34 and pushing the coupling bump 36.

By this, in this embodiment, a float body 3 having changed buoyancy can be suitably constituted, without changing the structure of the cylindrical body 33 constituting the float body 3, by fitting a buoyancy adjusting body 35 for changing the volume into the cylindrical body 33 according to need. Concretely, one can easily perform setting or tuning, such as to give buoyancy by which the float body 3 immediately moves to the maximally ascended position at the stage when the liquid surface level inside the lower chamber 2 reaches the same level of the inflow channel 24 or a level lower than this.

In the illustrated embodiment, it is made such that the float body 3 is always subject to a fixed upward force even in its descended position, by a compression coil spring 6 which is built in such that the upper spring end is inserted into the buoyancy adjusting body 35 from the lower end of the buoyancy adjusting body 35 and is pushed to the inner surface of the upper end of this buoyancy adjusting body 35, and the lower spring end is pushed to the inner surface of the bottom part of the cup part 27b.

The disclosure of Japanese Patent Application No. 2004-119579, filed on Apr. 14, 2004, is incorporated in the application.

While the invention has been explained with reference to the specific embodiments of the invention, the explanation is illustrative and the invention is limited only by the appended claims.

What is claimed is:

1. A valve for a fuel tank, comprising:
   an upper chamber communicating with a ventilation channel,
   a lower chamber to be disposed inside the fuel tank,
   a communicating part for communicating the upper chamber with the lower chamber, and
   a float body disposed inside the lower chamber with irregular gaps in between in a circumferential direction, said float body floating from a lower position to an upper position to block the communicating part from a side of the lower chamber when fuel flows into the lower chamber,
   wherein said lower chamber comprises an inner surface, and a plurality of support ribs protruding inwardly from the inner surface and extending along a moving direction of the float body to form flow channels for flowing gas therethrough between the inner surface of the lower chamber and an outer surface of the float body and between the ribs when the float body is situated at the lower position, protruding lengths of the ribs protruding inwardly from the inner surface of the lower chamber and situated adjacent to each other being different to form irregular gaps between the ribs, at least one large gap in the gaps forming a main flow channel.

2. A valve according to claim 1, wherein said communicating part includes a first connecting hole and a second connecting hole; said lower chamber has a substantially circular section in a horizontal direction, and a dividing plate dividing the lower chamber into a first chamber connected to the upper chamber through the first connecting hole and a second chamber connected to the upper chamber through the second connecting hole; said float body has a first float disposed inside the first chamber for floating to block the first connecting hole, and a second float disposed inside the second chamber for floating to block the second connecting hole, each of the first and second floats having a substantially circular section in a horizontal direction.

3. A valve according to claim 2, wherein said first and second floats have means for floating the first float first to block the first connecting hole and the second float next to block the second connecting hole.

4. A valve according to claim 3, wherein each of said first and second float bodies includes a cylindrical body having a lower open end, and a buoyancy adjusting body detachably fitted into the cylindrical body from the lower open end, said buoyancy adjusting body forming the floating means.

5. A valve according to claim 1, wherein a distance between two of the support ribs situated adjacent to each other is different from a distance between two of the support ribs adjacent thereto to form the irregular gaps.

6. A valve according to claim 5, wherein said support ribs are arranged inside the lower chamber to guide the float body inside the support ribs.

7. A valve according to claim 2, wherein said support ribs project from the dividing plate and inner surfaces of the first and second chambers, a distance between two of the support ribs situated adjacent to each other being different from a distance between two of the support ribs adjacent thereto to form the irregular gaps.

8. A valve for a fuel tank, comprising:
an upper chamber communicating with a ventilation channel,
a lower chamber to be disposed inside the fuel tank and having an inflow channel for allowing fuel to flow therein from the fuel tank,
a one-way valve attached to a bottom of the lower chamber for allowing the fuel to exit outwardly from the lower chamber and preventing the fuel to enter into the lower chamber therethrough,
a communicating part for communicating the upper chamber with the lower chamber, and
a float body disposed inside the lower chamber for floating from a lower position to an upper position to block the communicating part from a side of the lower chamber when the fuel flows into the lower chamber, said float body having buoyancy such that a fuel level in the lower chamber for completely blocking the communicating part is same as or lower than a level of the inflow channel.

9. A valve according to claim 8, wherein said float body includes a cylindrical body having a lower open end, and a buoyancy adjusting body detachably fitted into the cylindrical body from the lower open end.

* * * * *